No. 787,948. PATENTED APR. 25, 1905.
G. C. SCOTT.
POULTRY HOUSE.
APPLICATION FILED FEB. 15, 1904.

2 SHEETS—SHEET 1.

WITNESSES:
H. B. Bradshaw
A. L. Phelps

INVENTOR
Gerard C. Scott
BY
Shepherd & Parker
ATTORNEYS

No. 787,948. PATENTED APR. 25, 1905.
G. C. SCOTT.
POULTRY HOUSE.
APPLICATION FILED FEB. 15, 1904.

2 SHEETS—SHEET 2.

WITNESSES:
H. B. Bradshaw,
A. L. Phelps

INVENTOR
Gerard C. Scott
BY
Shepherd & Parker
ATTORNEYS.

No. 787,948. Patented April 25, 1905.

UNITED STATES PATENT OFFICE.

GERARD C. SCOTT, OF COLUMBUS, OHIO.

POULTRY-HOUSE.

SPECIFICATION forming part of Letters Patent No. 787,948, dated April 25, 1905.

Application filed February 15, 1904. Serial No. 193,483.

*To all whom it may concern:*

Be it known that I, GERARD C. SCOTT, a citizen of the United States, residing at Columbus, in the county of Franklin and State of Ohio, have invented a certain new and useful Improvement in Poultry-Houses, of which the following is a specification.

My invention relates to the improvement of poultry-houses, and has particular relation to the construction of that class of poultry-houses in which the raising of poultry is conducted on a comparatively large scale.

The objects of my invention are to provide an improved construction and arrangement of parts whereby sand or other desirable material and food are automatically distributed to a plurality of adjacently-arranged poultry-containing compartments, to provide means whereby the supply of material to the compartments, the distribution of the material on the floors thereof, and the discharge of the material are accomplished by the action of the fowls contained in the compartments, and whereby the fowls in order to obtain food secure such exercise as is needful and by their own action maintain the floors in a comparatively clean condition. These objects I accomplish in the manner illustrated in the accompanying drawings, in which—

Figure 1:
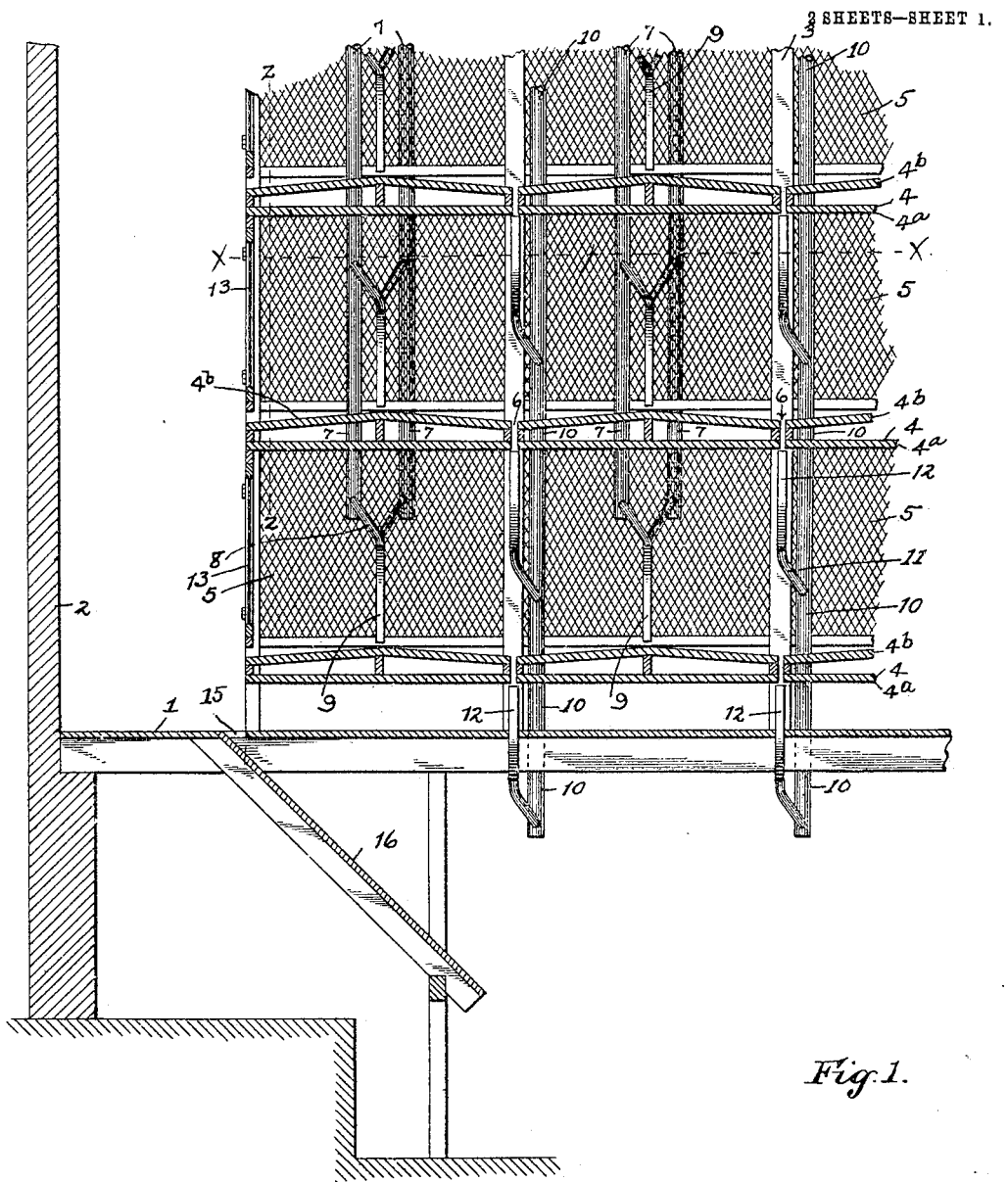
Figure 2:
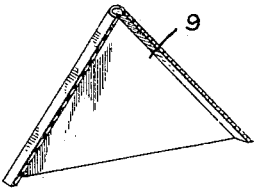
Figure 3:
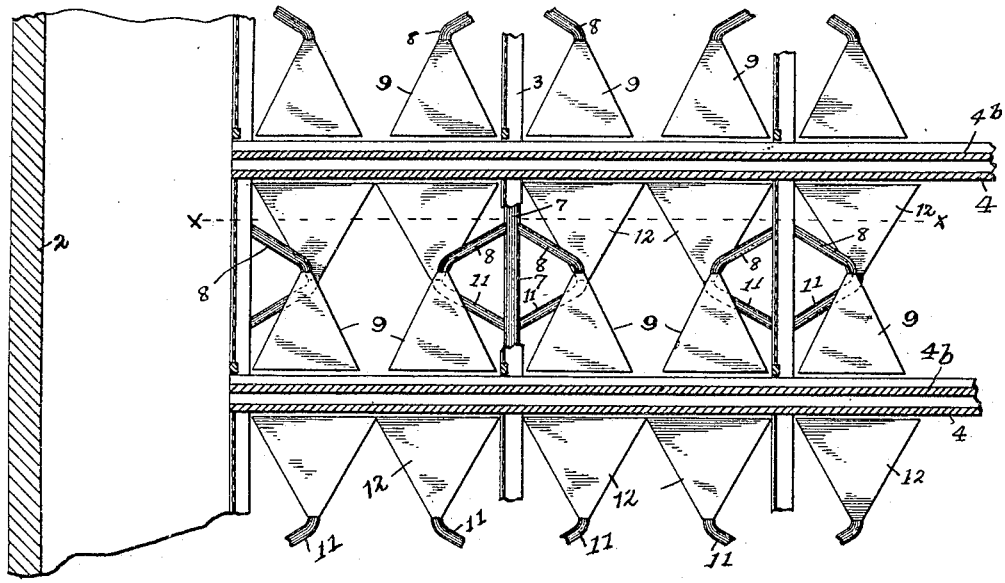
Figure 4:
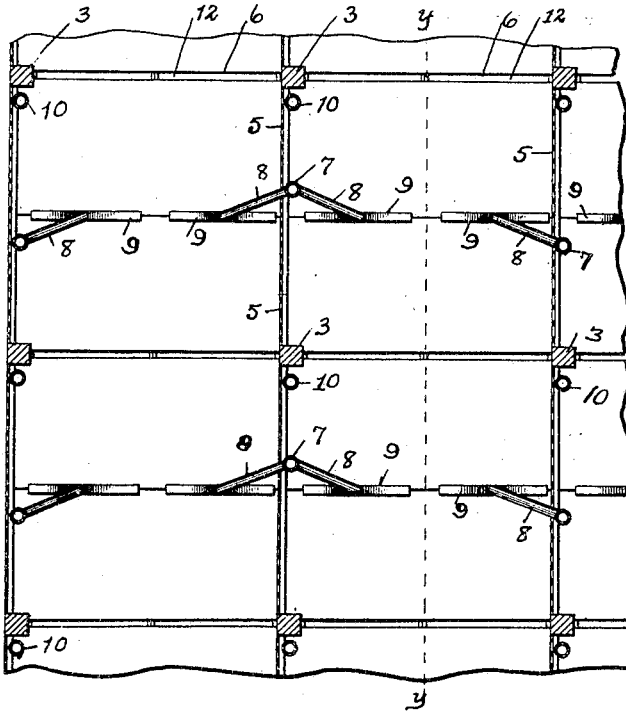

Figure 1 is a sectional view through several adjoining poultry-compartments constructed in accordance with my invention, said view being taken on line $y\,y$ of Fig. 4. Fig. 2 is a perspective view of one of the sand and food discharge heads, one face of the latter being broken away for the sake of clearness in illustration. Fig. 3 is a view on line $z\,z$ of Fig. 1; and Fig. 4 is a sectional view on line $x\,x$ of Fig. 1 and Fig. 3, the discharging-heads cut by said section-line being omitted for the sake of clearness in illustration.

Similar numerals refer to similar parts throughout the several views.

In carrying out my invention I construct, preferably within a suitable building, of which 1 represents the floor, and 2 a portion of one of the side walls, a suitable framework structure comprising connected standards 3. Supported by these corner-posts are parallel floors 4, arranged one above the other, as shown, and between these floors are arranged at desirable intervals vertical partitions 5, preferably of woven wire or similar material, these partitions extending throughout the length of the structure and serving to divide the latter into parallel longitudinally-arranged compartments. The floors of these compartments are separated at regular intervals, as indicated more clearly in Fig. 1 of the drawings, by lateral openings or spaces 6, thus dividing each of the compartment-floors into horizontal sections $4^{a}$. Supported upon each of these sections $4^{a}$ is an upper floor-section or deck $4^{b}$, the latter inclining from its center to the outlets or spaces 6. Leading downward through each tier of compartments and at intervals throughout the length thereof are vertically-arranged supply-pipes 7. These supply-pipes terminate in the lower compartments and lead from a suitable supply hopper or bin located above the structure and not herein shown. The pipes 7 are arranged, as shown, near the partitions 5 and also near the apexes of the decks $4^{b}$. From each of these supply-pipes lead outward and downward into adjoining compartments pipe-arms 8, each of said pipe-arms connecting with the apex of a flattened hollow discharge-head 9 of a flaring or triangular form, the lower open end of which extends transversely of the compartment within which the same is located and terminates immediately above the apex of the corresponding deck $4^{b}$. In this manner two of said discharging-heads are arranged over the apex or higher portion of each of said decks, one on each side of the center of the width thereof. I also provide vertically-arranged discharge-pipes which extend downward through the tiers of compartments at desirable intervals, these pipes being indicated at 10, and with each of the discharge-pipes are connected opposing upwardly-inclined pipe-arms 11, these pipe-arms being connected with the smaller ends or apexes of inverted heads 12, corresponding in construction with the heads 9. These heads 12 are thus supported with their open or mouth ends immediately beneath the outlets or slotted openings 6 of the floors and decks. The discharge-pipes 10, as indicated in Fig. 1 of the drawings, are adapted to extend downwardly through the floor 1 of the building. The outer sides of the structure which comprises the connected compartments may be provided with suitable doorways and doors, which in Fig. 1 are indicated at 13, and these doorways may lead into passages 14 of the main building. In this connection I preferably provide along the front of the compartment structure a longitudinal opening 15 in the floor 1, beneath which is arranged a downwardly-extending inclined conductor-frame 16.

In practice the supply-pipes 7 are constantly filled with material, which preferably consists of combined sand and grain or other suitable food, and this combination of material is discharged through the various pipe-arms 8 and their heads 9 onto the higher and central portions of the decks $4^b$. Owing to the proximity of the discharging-heads 9 to the decks, it is obvious that the continuous and free flow of the material from said heads will be retarded by the clogging or partial choking of the discharging-mouths of the heads, which will result from the deposit of the material onto the center of the deck. In their efforts to secure the food contained in the material thus deposited or discharged the latter is gradually worked away from the point of discharge by the "scratching" action of the fowls. In this scratching operation it will be understood that the material will be gradually carried down the inclined upper faces of the decks $4^b$ and discharged, together with other waste material, through the openings 6 into the heads 12, thence through the pipe-arms 11 to the outlets or discharge-pipes 10. It will also be understood that the natural scratching operation by the fowls will not only result in permitting a gradual feed of the combined food and sand onto the deck and supplying food to the fowls, but in the surfaces of the decks being kept comparatively clean and free from the accumulation of undesirable matter.

From the construction which I have described it will be understood that a comparatively large number of fowls may be contained and fattened within a structure which occupies a comparatively small area or space and that a constant supply of food is furnished the fowls through their own efforts, such efforts being sufficient to give the fowls contained in the compartments needed exercise.

Having now fully described my invention, what I claim, and desire to secure by Letters Patent, is—

1. In a poultry-house, the combination with a compartment having an inclined floor, of a conduit for supplying feed to the floor, and a conduit arranged at the lower end of the floor for removing waste and feed.

2. In a poultry-house, the combination with a compartment having an inclined floor, of a conduit provided with a discharge-spout disposed in close proximity to the upper portion of the floor, and a conduit provided with a hopper arranged at the lower end of the inclined floor.

GERARD C. SCOTT.

In presence of—
 A. L. PHELPS,
 W. L. MORROW.